(12) United States Patent
Finch

(10) Patent No.: US 10,433,498 B1
(45) Date of Patent: Oct. 8, 2019

(54) SYSTEM FOR IMPROVING PLANT YIELD

(71) Applicant: Jason Finch, Boone, NC (US)

(72) Inventor: Jason Finch, Boone, NC (US)

( * ) Notice: Subject to any disclaimer, the term of this patent is extended or adjusted under 35 U.S.C. 154(b) by 181 days.

(21) Appl. No.: 15/419,410

(22) Filed: Jan. 30, 2017

Related U.S. Application Data

(60) Provisional application No. 62/288,189, filed on Jan. 28, 2016.

(51) Int. Cl.
| | |
|---|---|
| *A01G 9/12* | (2006.01) |
| *A01G 22/00* | (2018.01) |
| *A01G 9/02* | (2018.01) |
| *A01G 7/04* | (2006.01) |
| *A01G 17/06* | (2006.01) |

(52) U.S. Cl.
CPC ............ *A01G 22/00* (2018.02); *A01G 7/045* (2013.01); *A01G 9/021* (2013.01); *A01G 9/12* (2013.01); *A01G 9/128* (2013.01); *A01G 17/06* (2013.01)

(58) Field of Classification Search
CPC .......... A01G 9/12; A01G 9/122; A01G 17/06; A01G 9/126
See application file for complete search history.

(56) References Cited

U.S. PATENT DOCUMENTS

| | | |
|---|---|---|
| 834,672 A | 10/1906 | Hood |
| 1,988,691 A | 1/1935 | Lovett, Jr. ........................ 47/73 |
| 4,631,861 A | 12/1986 | Wuthrich ........................ 47/70 |
| 5,916,028 A | 6/1999 | Downer et al. .................. 47/46 |
| 6,151,876 A | 11/2000 | Van Der Burg ................ 56/234 |
| 2005/0132645 A1* | 6/2005 | Johns ..................... A01G 9/122 47/42 |
| 2007/0289210 A1* | 12/2007 | Gray ........................ A01G 9/12 47/47 |
| 2010/0115838 A1* | 5/2010 | Jolley ..................... A01G 9/12 47/66.7 |
| 2010/0126064 A1 | 5/2010 | Cunningham .................... 47/44 |
| 2011/0197505 A1* | 8/2011 | Hansen ................... A01G 9/12 47/65.8 |
| 2014/0259911 A1 | 8/2014 | Davis ........................... 47/65.5 |

FOREIGN PATENT DOCUMENTS

| | | | |
|---|---|---|---|
| WO | WO2013164236 | 11/2013 | ............. A01G 27/04 |

* cited by examiner

*Primary Examiner* — Kristen C Hayes
(74) *Attorney, Agent, or Firm* — MacCord Mason PLLC

(57) ABSTRACT

An apparatus for improving plant yield. The apparatus includes a plant container adapted to be movable between a first plant growing direction and a second plant growing direction. In one embodiment, the plant container includes a first rigid outer container and a second flexible inner container adapted to be received by the outer container and for containing growing media for one or more plants. The apparatus may further include a rigid trellis attached to the plant container. The present inventions also include a method for improving the growth efficiency and yields of a plant.

37 Claims, 13 Drawing Sheets

SYSTEM FOR IMPROVING PLANT YIELD

This application claims the benefit of Provisional Application Ser. No. 62/288,189 filed Jan. 28, 2016.

BACKGROUND OF THE INVENTIONS

Field

The present inventions relate generally to commercial plant growing containers and, more particularly, to an apparatus and method for improving plant yield.

Related Art

Trellises are commonly used to provide support for plant structures, such as vines and stems, as the plant continues to grow. The extra support enables such plant structures to receive adequate light for continued growth. Without a trellis, these plant structures can break from its weight, wilt and decay from a lack of sufficient light or mold from lack of sufficient airflow due to poor branch spacing.

Traditional trellises typically consist of a non-adjustable rigid grid with predetermined spacing, which may not always be in the desired location for branches. Once a plant grows up through a traditional trellis, it may become entwined and difficult to adjust branch spacing without harming leaves and flowers. Thus, as a plant continues to grow, traditional trellises require a user to regularly prune the branches or detach, move and re-attach branches from the trellis to maintain optimal airflow and even light penetration. Additional labor time is incurred when the user needs to cut off excess branches or detach and rehang them for proper spacing.

Lack of pruning leads to light obstruction from the overlapping of branches, which creates overall lower quality growth and reduces the yield and quality of any produce growing on a plant. Each pruning reduces productivity and efficiency, since the growth cycle time increases by about a week.

Moreover, traditional trellises are often positioned vertically, which limits the amount of light received by the plant. Changing the position of a trellis is typically difficult due to the rigidity of the trellis as well as the plant pot itself. Plant pots typically house the root ball of a plant within a growing media such as soil. Therefore, positioning the plant pot to modify the angle of the trellis results in spilling of the pot's contents.

Thus, there remains a need for improving plant yield while, at the same time, reducing the need for regular pruning or rehanging branches associated with traditional trellises.

SUMMARY OF THE INVENTIONS

The present inventions are directed to an apparatus for improving plant yield. The apparatus includes a plant container adapted to be movable between a first plant growing direction and a second plant growing direction. In one embodiment, the plant container includes a first rigid outer container and a second flexible inner container adapted to be received by the outer container and for containing growing media for one or more plants. The apparatus may further include a rigid trellis attached to the plant container.

The rigid outer container may include a top, a bottom and side walls, wherein at least the top and a portion of the sidewalls are an open lattice network. In one embodiment, the open lattice network is about 50% open to provide structural support of the flexible inner container while, at the same time, permitting access to the flexible inner container.

The rigid outer container may be generally rectangular. In one embodiment, the rigid outer container is generally cubic to provide stackability and high-density population with respect to adjacent containers.

The rigid outer container may also further include an angled support base. In one embodiment, the angled support base is at about 45° degrees.

At least a portion of the flexible inner container is porous to permit water to be added directly to the plant by passing through the inner container. In one embodiment, the flexible inner container is a knitted fabric. In one preferred embodiment, the flexible inner container is formed of a single knit jersey polypropylene fabric.

In one embodiment, the porosity of the flexible inner container is greater than about 40% porosity and less than about 85% porosity to allow water and water with nutrients to be added to the plant growing media through the porous wall of the flexible inner container. In one preferred embodiment, the porosity of the flexible inner container is about 60% porosity.

In one embodiment, the pore size of the flexible inner container is less than about 0.2 millimeters and greater than about 0.05 millimeters. In one preferred embodiment, the pore size of the flexible inner container is about 0.15 millimeters.

The apparatus may further include a soil volume spacer adapted to be positioned between the bottom of the rigid outer container and the bottom of the flexible inner container and adapted to reduce the amount of plant growing media in the flexible inner container. In one embodiment, the soil volume spacer is a rectangular support block.

The trellis may include at least one pole and a plurality of support wires attached to the pole. In one embodiment, the apparatus further includes a trellis support attached to the distal end of the pole adapted to position the plant container in its second plant growth direction. In one embodiment, the trellis support is a connector attachable to an adjacent plant container. In another embodiment, the support is a bipod.

The ends of the support wires may be blunted. In addition, the support wires may be spring loaded for providing positioning along the length of the pole. In one embodiment, the support wires are bendable to be positionable along a plant's branches.

In one embodiment, the trellis is removably attached to the plant container.

The apparatus may further include a grow light bar. In one embodiment, the grow light bar is attached along the length of the trellis parallel to the plant first growing direction.

Accordingly, one aspect of the present inventions is to provide an apparatus for improving plant yield, the apparatus comprising a plant container adapted to be movable between a first plant growing direction and a second plant growing direction.

Another aspect of the present inventions is to provide a plant container for improving plant yield adapted to be movable between a first plant growing direction and a second plant growing direction, the plant container including (a) a first rigid outer container; and (b) a second flexible inner container adapted to be received by the outer container and for containing growing media for one or more plants.

Still another aspect of the present inventions is to provide an apparatus for improving plant yield, the apparatus including (a) a plant container adapted to be movable between a first plant growing direction and a second plant growing direction, the plant container including (i) a first rigid outer container and (ii) a second flexible inner container adapted to be received by the outer container and for containing growing media for one or more plants and (c) a rigid trellis attached to the plant container.

These and other aspects of the present inventions will become apparent to those skilled in the art after a reading of the following description of the preferred embodiment when considered with the drawings.

DESCRIPTION OF THE PREFERRED EMBODIMENTS

Figure 1A:
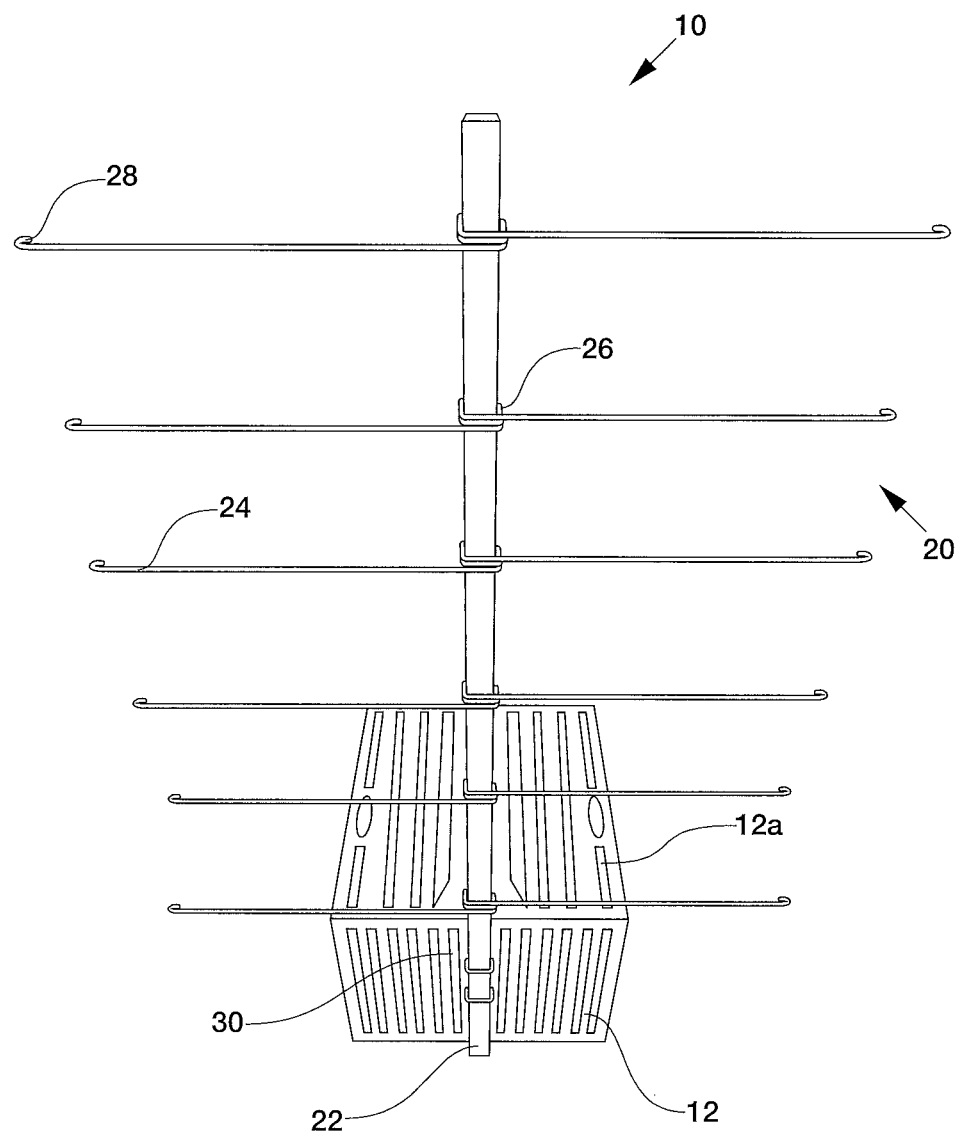
FIG. 1A is a front elevational view of a plant container for improving plant yield positioned in a first plant growing direction constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1B:
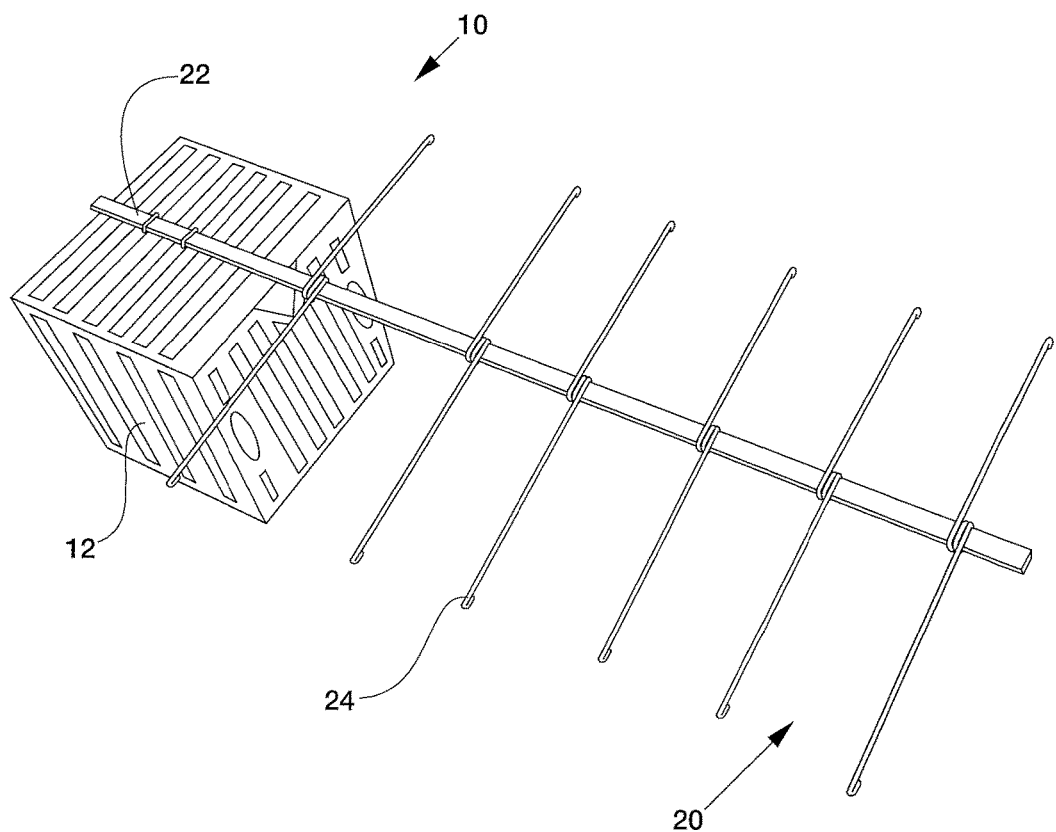
FIG. 1B is an overhead perspective view of the plant container shown in FIG. 1A positioned in a second plant growing direction.

Referring now to the drawings in general and FIGS. 1A and 1B in particular, it will be understood that the illustrations are for the purpose of describing a preferred embodiment of the invention and are not intended to limit the invention thereto. As best seen in FIG. 1A, a plant container for improving plant yield, generally designated 10, is shown constructed according to the present inventions. The plant container 10 includes a rigid outer container 12 and a flexible inner container 14. Plant container 10 may further include a trellis 20 for supporting a main plant stem. Rigid outer container 12 may include a top 12a, a bottom and side walls, so that plant container 10 may be positioned in a plurality of plant growing directions. FIG. 1A depicts one embodiment of a plant container 10 positioned on its bottom wall such that a plant grows in a first plant growing direction with trellis 20 vertically oriented. FIG. 1B depicts the plant container 10 positioned on one of its side walls, such that the plant grows in a second plant growing direction with trellis 20 oriented horizontally.

Rigid outer container 12 may function to hold the shape of flexible inner container 14. For example, rigid outer container 12 may provide support by preventing flexible inner container 14 from touching the ground, thereby providing air circulation and drainage for the root ball within flexible inner container 14. In one embodiment, rigid outer container 12 includes handles 30 for lifting plant container 10. Rigid outer container may also serve as an attachment point for trellis 20. For example, trellis 20 may be mounted onto rigid outer container 12 in a traditional vertical position. Alternatively, trellis 20 may be mounted in a horizontal position. Rigid outer container 12 may also be used for attachment points of irrigation systems and other growing accessories.

The shape of rigid outer container 12 may vary. In one embodiment, rigid outer container 12 may be generally rectangular. As shown in the embodiments of FIGS. 1A and 1B, rigid outer container 12 is generally cubic. In other embodiments, the number of plant growing directions may be adjusted depending on the rigid outer container's shape and number of walls. For example, rigid outer container 12 may be a dodecahedron with 12 walls. Nor is trellis 20 limited to necessarily a perpendicular or parallel orientation in relation to the ground. Trellis 20 may form any angle in relation to the ground. In one embodiment, the angle may be dependent on the shape of the rigid outer container.

Figure 2:
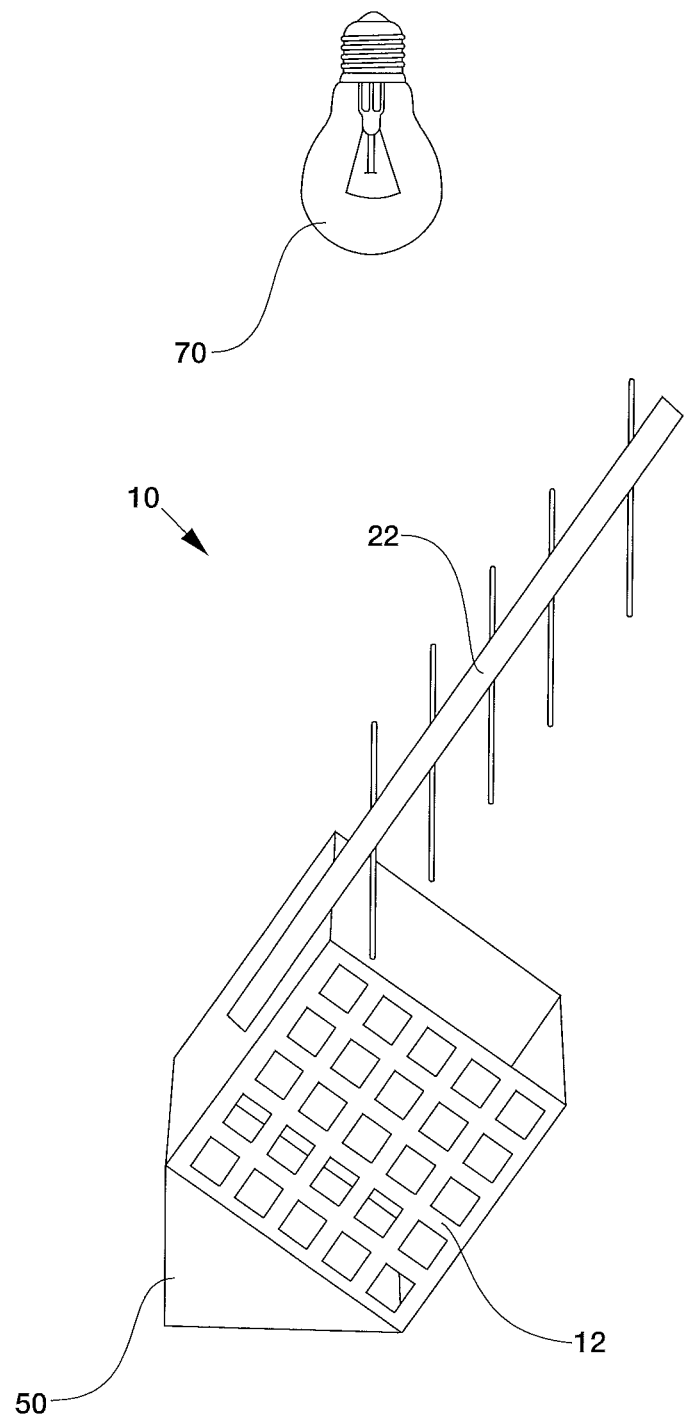
FIG. 2 is an illustration depicting one embodiment of a plant container positioned at an angle increasing its exposure to a grow light.

In other embodiments, the angle may be adjusted with an angled support base 50. As shown in the example of FIG. 2, angled support base 50 may position plant container 10 at an angle of about 45° degrees. The angle of plant container 10 may vary with respect to the height and intensity of the grow light 70. In one embodiment, the distance between the plant canopy and grow light 70 is preferably adjusted so that the grow light is sufficiently close without burning the plant. For example, some lights, such as HID lamps, are more intense and may need to be spaced about 25 inches from the top of a canopy. By way of another example, fluorescent lights are of lower intensity and may be placed about 5 inches from the top of a canopy. Angling plant container 10 can expose a larger surface area of the plant to the grow light, thereby increasing growing efficiency and yield.

Figure 3:
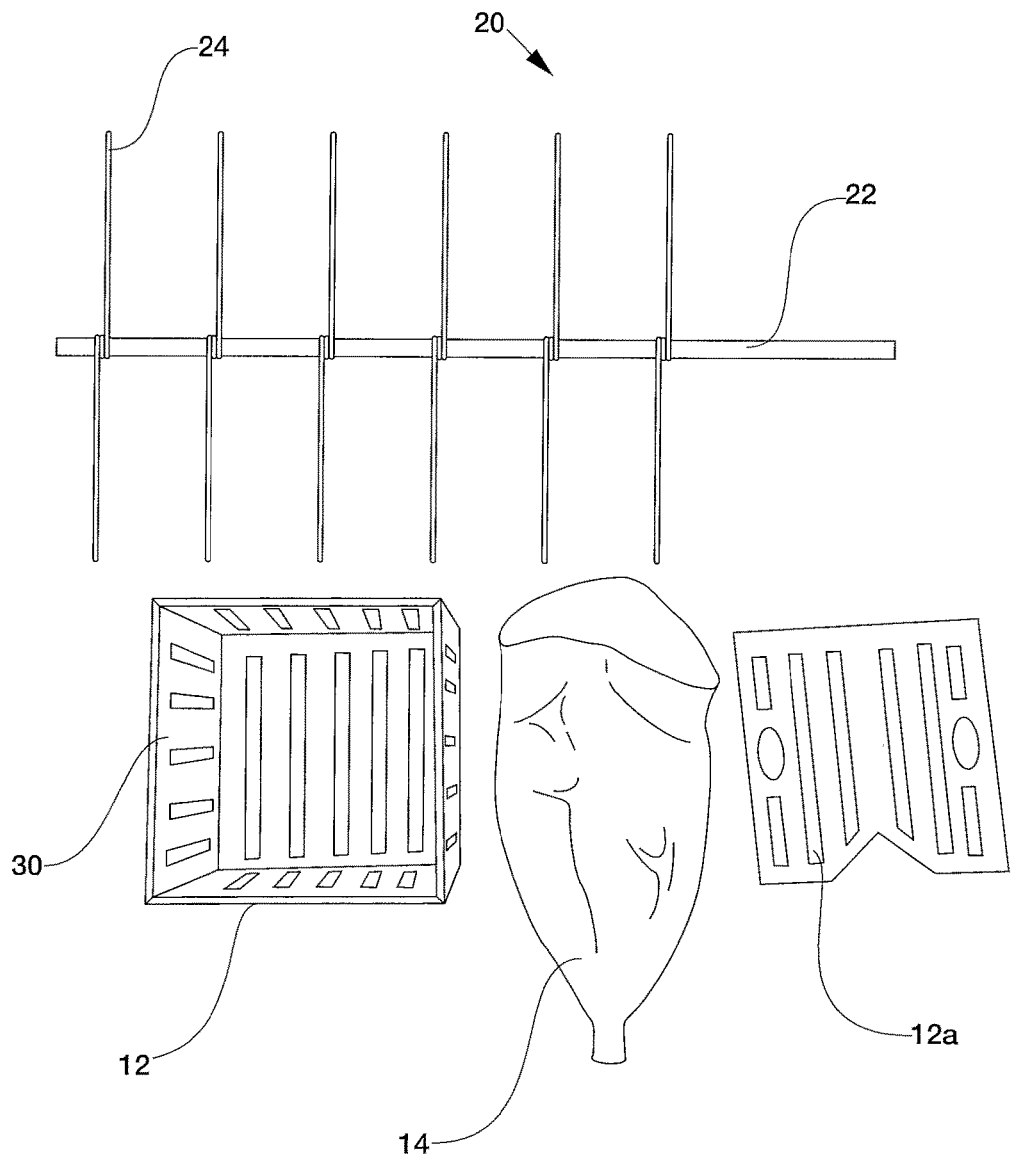
FIG. 3 is a disassembled view of a plant container constructed according to the present inventions.

Positioning plant container 10 is also facilitated by including a flexible inner container 14 within rigid outer container 12. FIG. 3 shows a disassembled view of plant container 10 from the embodiment shown in FIG. 1, further including the flexible inner container 14. Flexible inner container 14 assists with retaining growth media within plant container 10 and reducing spillage based on positioning of rigid outer container 12. Flexible inner container 14 may close around the plant stem without constricting stem growth while sealing in growth media, such as soil, so that it will not escape the plant container 10 when rigid outer container 12 is placed on any of its walls. The tight seal provided by flexible inner container 14 may also prevent bugs from getting into or out of the soil.

Figure 4A:
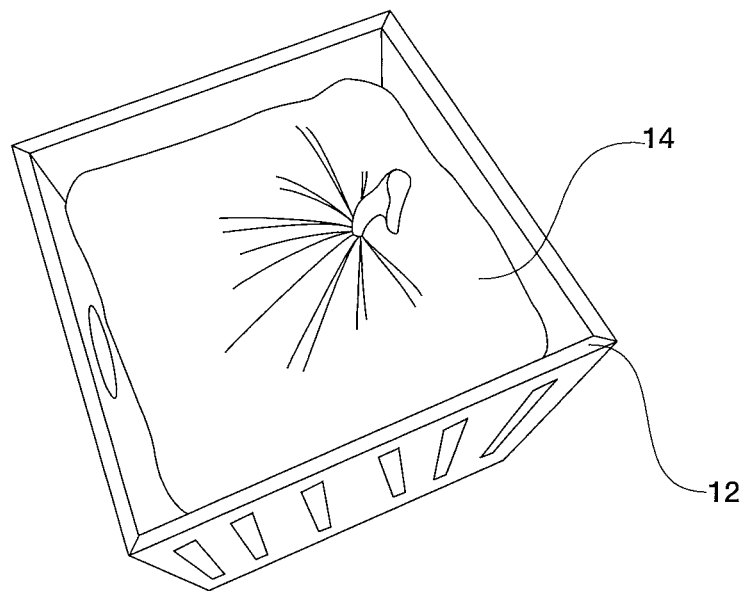
FIG. 4A is an overhead perspective view of a flexible inner container within a partially assembled rigid outer container.
Figure 4B:
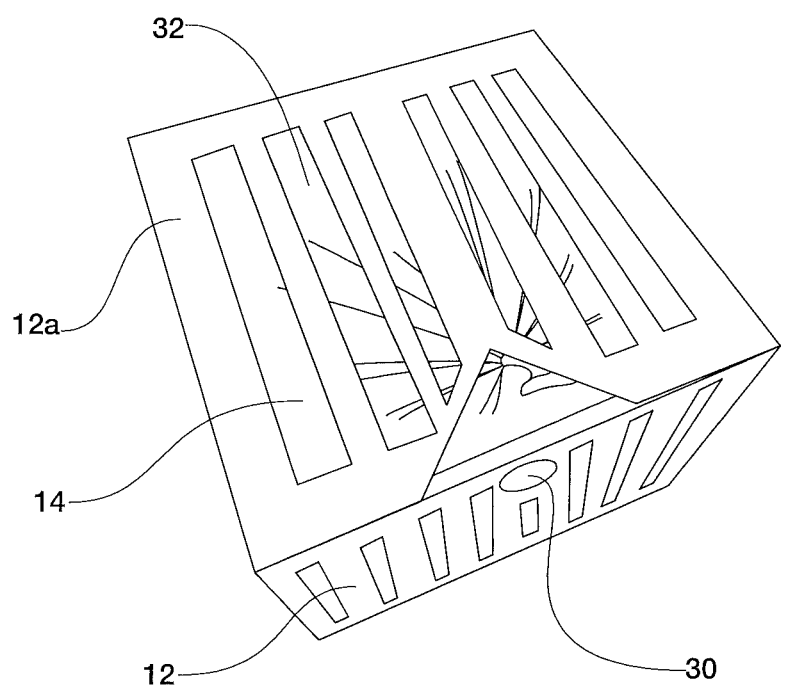
FIG. 4B is an overhead perspective view of a rigid outer container with a flexible inner container inside.

FIG. 4A illustrates one embodiment of how flexible inner container 14 is placed within rigid outer container 12. Rigid outer container 12 may include one or more walls that are removable. As shown in the embodiment of FIG. 4A, top wall of rigid outer container 12 is removable so that flexible inner container 14 may be inserted (or removed). The flexible inner container 14 is held within rigid outer container 12 by re-securing the wall back onto rigid outer container 12, as seen in FIG. 4B. The removable wall may be secured onto rigid outer container 12 through any means, such as through a friction fit or additional mounting accessories. In other embodiments, flexible inner container 14 may be inserted by opening one or more walls of rigid outer container 12. For example, one or more walls of rigid outer container 12 may further include a hinge to pivot the wall open.

As best seen in FIGS. 4A and 4B, the walls of rigid outer container 12 may comprise an open lattice network. In one example, at least the top and a portion of the sidewalls may be an open lattice network. The open lattice network may be included to provide structural support for flexible inner container 14 while, at the same time, permitting access to flexible inner container 14. Interstitial holes 32 of the open lattice network may comprise any shape. In one embodiment, interstitial holes 32 of rigid outer container 12 are circular. The open lattice network may comprise of interstitial holes having a variety of sizes and shapes, or may be uniform with respect to size and/or shape. Interstitial holes 32 are sized such that there is sufficient structural support for flexible inner container 14. For example, the open lattice network may be about 50% open.

In one embodiment, flexible inner container 14 may be comprised of an elastomeric fabric. Flexible inner container 14 may stretch and contract according to the moisture content of the soil. Unlike traditional plant containers, flexible inner container 14 may aid in preventing the soil from separating from the sides of the container as the soil dries out. By way of example, flexible inner container 14 may be formed of a single knit jersey fabric comprised of polypropylene. Yet in other embodiments, flexible inner container 14 may be constructed via double knit, woven, non-woven and other fabric formation techniques.

In one embodiment, at least a portion of flexible inner container 14 may be porous. Inclusion of pores on at least a portion of flexible inner container 14 may enable air and water to freely flow through, while also enabling excess moisture to drain away. For example, a user may hand water a root ball within flexible inner container 14 by pouring water on the top of plant container 10, independent on the orientation of the rigid outer container 12. By way of another example, drip irrigation may be used to water a root ball within flexible inner container 14.

Figure 5:
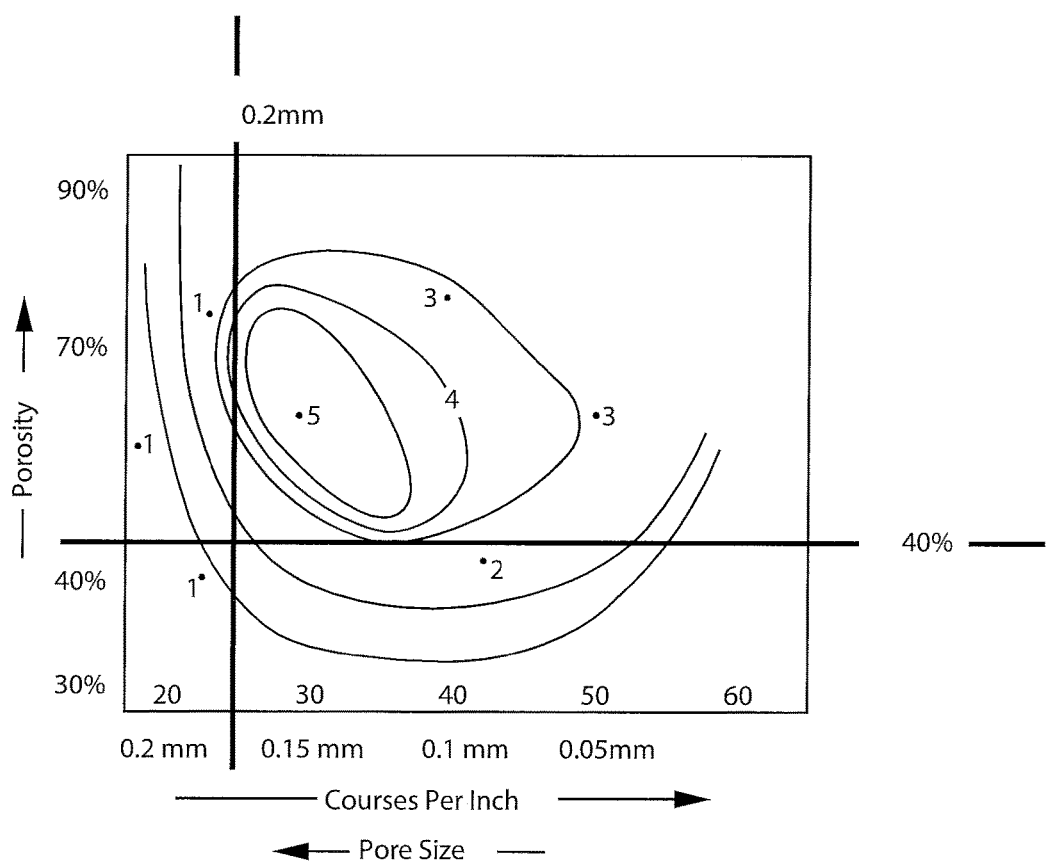
FIG. 5 is a response surface showing the relationship between porosity and pore size for various jersey knitted inner containers constructed according to the present inventions.

FIG. 5 illustrates the desired relationship between the porosity and pore size for a jersey knitted inner container. The ideal inner container should have sufficient porosity for air and liquids to freely pass through the material, yet have a pore size small enough so that soil does not leak from the container. As shown, pore size is measured using both mm and courses per inch (CPI). Pore size decreases moving from left to right on the X-axis (from 0.2 mm to 0.05 mm). Pore size decreases at the same time as CPI increases (shown as from 20 to 60). The curves on the chart represent boundary conditions, where the boundaries are represented by numbers from 1 to 5 indicating the least to most desirable ranges.

Porosity was calculated according to the following equation:

$$\varepsilon = 1 - \frac{\pi d^2 lCW}{2t}$$

where t is the sample's thickness (cm), l is the elementary loop length (cm), d is the yarn diameter (cm); C is the number of courses per cm; and W is the number of wales per cm. See AUTEX Research Journal, Vol. 7, No. 1, March 2007.

As shown in FIG. 5, decreasing porosity limits airflow and the ability for water to pass through the inner container. However, as porosity increases, durability of the fabric also becomes a factor. In order to increase porosity while maintaining a specific pore size, the yarn may be produced thinner.

At a certain range, once the pore size decreases, the desirability of the fabric may also decrease since there may be a sacrifice in the fabric's durability in order to retain the same level of porosity. Once the pores increase to a certain size, desirability quickly drops off since the soil can no longer be contained within the bag (see vertical line of ≤0.2 mm).

Data from the response surfaces indicate that the most desirable fabrics for use as an inner container have a porosity greater than about 40 percent to allow water and water with nutrients to be added to the plant growing media through the porous wall of said flexible inner container. For example, the porosity may be about 60 percent. The pore sizes of flexible inner container 14 may be less than about 0.2 mm. For example, the pore size may be about 0.15 mm. In another example, the porosity may be 0.10 mm.

Figure 6:
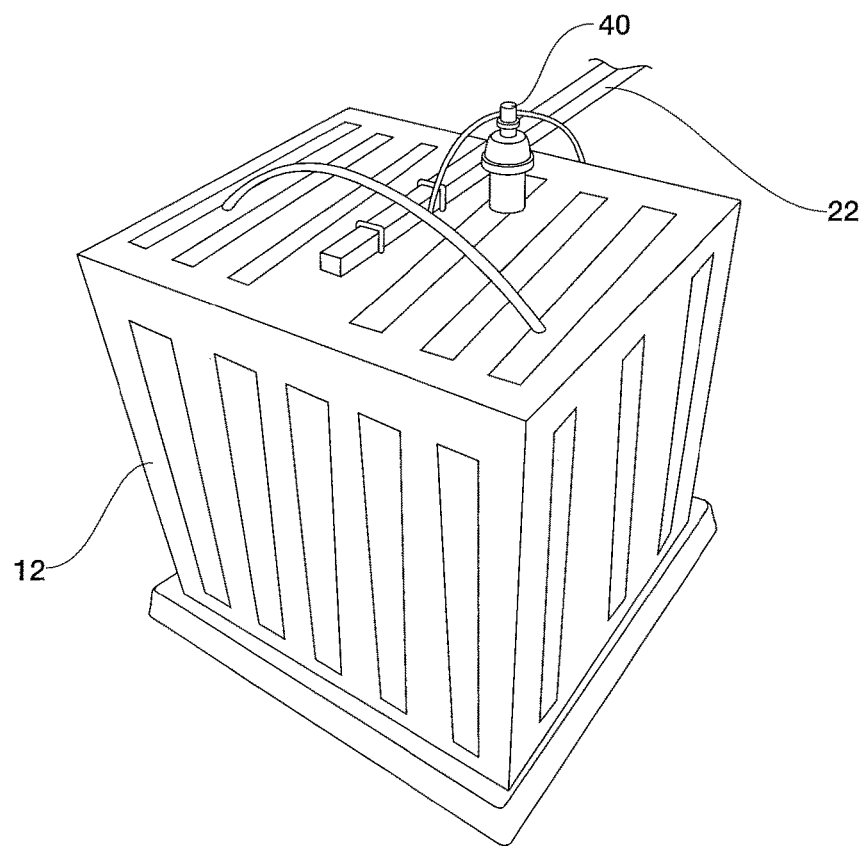
FIG. 6 is an enlarged perspective view of another plant container constructed according to the present inventions.
Figure 7:
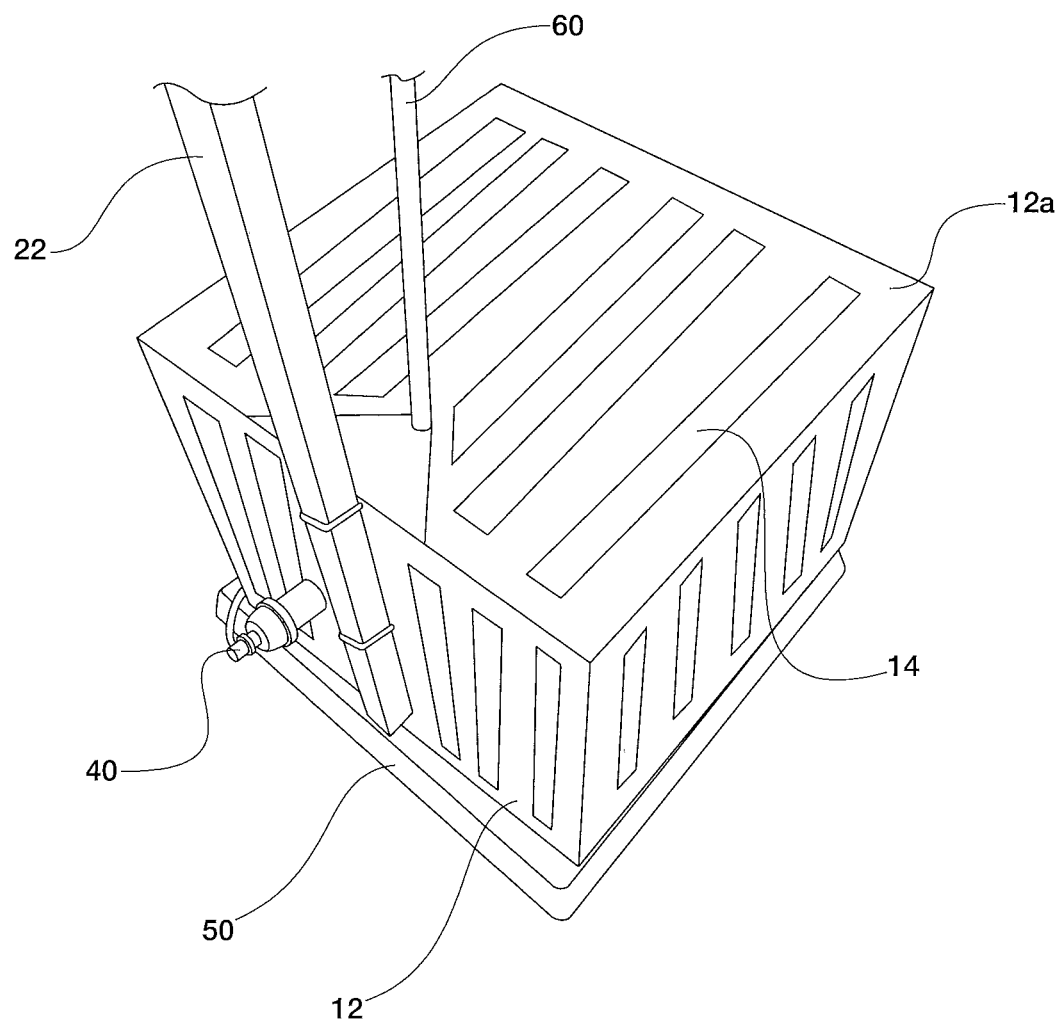
FIG. 7 is an enlarged perspective view of another plant container constructed according to the present inventions.

These values are for flexible inner containers intended to be used with soil growing media, and will differ for other types of growing media. For example, growing media may comprise a hydroponic solution. FIGS. 6 and 7 illustrate embodiments where flexible inner container 14 comprises a solid material for holding a hydroponic nutrient solution. In the embodiments shown, flexible inner container 14 is constructed to hold liquid nutrients and is capable of connecting feed and drain water hoses 40 and or air hoses to provide oxygen to the nutrient solution. As shown in FIG. 7, flexible inner container 14 may further include an opening for a plant stem 60 to protrude therefrom.

Various sizes of plant container 10 may be manufactured depending on the needs of a consumer. Sizing may vary with respect to rigid outer container 12, flexible inner container 14, or both. Plant container 10 may also include a soil volume spacer to reduce the amount of plant growing media needed in flexible inner container 14. The soil volume spacer may be comprised of a rigid or malleable material. Soil volume spacer may be wedged between flexible inner container 14 and one or more walls of rigid outer container 12. For example, soil volume spacer may be positioned between the bottom of rigid outer container 12 and the bottom of flexible inner container 14. Soil volume spacer can be of any size or shape. By way of example, the soil volume spacer may be a rectangular support block. The size of soil volume spacer is dependent on the open lattice network of rigid outer container 12, and should be sized such that soil volume spacer does not fall through an interstitial hole. The soil volume spacer may also be used in combination with any other type of growing media besides soil, including hydroponic solutions.

Trellis 20 may be comprised of at least one pole 22 with a plurality of support wires 24 attached. Support wires 24 may be utilized for proper spacing of a plant's branches to prevent touching and for optimal airflow. Support wires 24 may also aid with drying. In one embodiment, support wires 24 are adjustable. For example, support wires 24 may be adjusted to prevent plant branches from touching one another as the plant gets bigger throughout its growth cycle. Adjusting support wires may further promote better air circulation and provide even light penetration to create equal growth to areas of a plant that would normally be pruned off due to lack of light penetration.

In one embodiment, support wires 24 are bendable to provide one means of adjusting their positioning. Bendable support wires may also enable arrangement of a plant branches in three dimensions according to a user's preferences. For example, support wires may be bent for running and bent back for growing. In another embodiment, as shown back in FIG. 1A, the ends 28 of support wires 24 may be blunted.

Support wires 24 may be adjusted along pole 22. Support wires 24 may also be removable from pole 22. For example, pole 22 may include holes along its length to insert support wires 24, wherein support wires 24 may be placed anywhere by a user to support individual branches protruding off of a plant's main stem. Support wires 24 can be inserted through the holes, and may be further secured by bending around pole 22. Additional support wires 24 may also be added by a user to pole 22 as needed. For instance, a user may insert additional support wires in accordance with the plant's branch count and spacing throughout its life cycle.

Figure 8A:
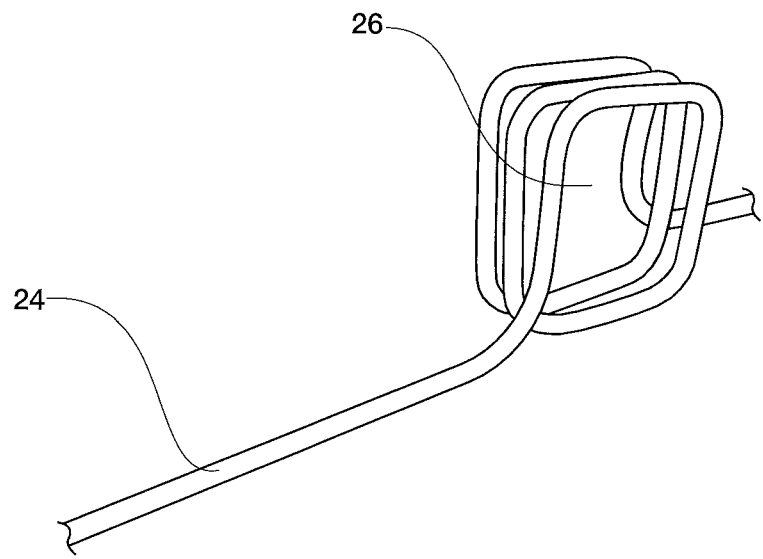
FIG. 8A is an enlarged view of one embodiment of a support wire constructed according to the present inventions.
Figure 8B:
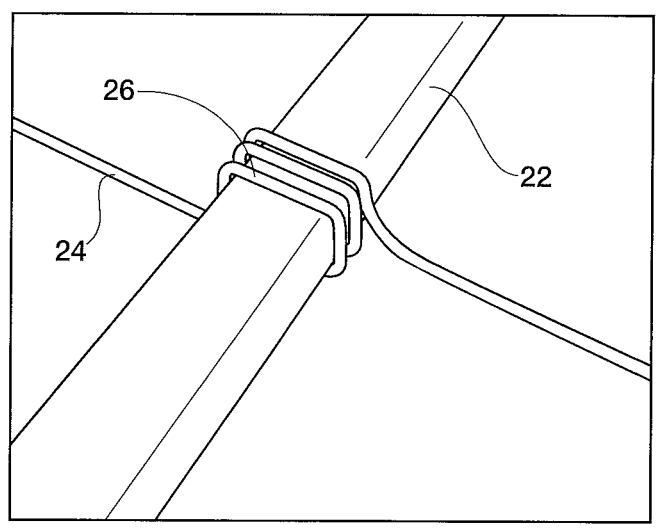
FIG. 8B is an enlarged view of the support wire shown in FIG. 8A installed onto a pole.

In another embodiment, as shown in FIGS. 8A and 8B, support wires 24 may comprise a spring-like bent wire forming a cavity 26 near its center. As best seen in FIG. 8, cavity 26 may be inserted into pole 22 to secure support wire 24 onto pole 22. Adjusting placement of support wire 24 is achieved by pulling wire ends together and sliding over pole 22 to desired location. When the ends of support wire 24 are released, cavity 26 contracts around pole 22 to prevent further movement.

Typically, trellises require a user to cut off branches from a plant's main stem and rehanging to dry them. In one embodiment, pole 22 may be detachable from plant container 10. Detaching pole 22 can save time from such labor. For example, when a plant has finished its life cycle, the main stem of the plant may be cut from the root ball. Trellis 20 is detached from plant container 10 while the whole plant is still attached to trellis 20 for hanging. Trellis 20 may function as a drying rack for the plant material attached to trellis 20, when pole 22 is detached from plant container 10.

When the plant grows to the top of the trellis when it is in the vertical position it is time to tip it over so the trellis is horizontal. This method shortens the growth cycle since no pruning is required to reduce the plant canopy depth. Each pruning can increase the growth cycle time by about a week.

Trellis 20 may also include a trellis support for positioning plant container 10 in a plant growth direction. The trellis support may be found on the distal end of pole 22. The trellis support may be a connector that is removably attachable to plant container 10. For example, the trellis support may be a bipod. In another embodiment, trellis 20 may be integrated with rigid outer container 12.

In one embodiment, trellis 20 may further include a grow light bar 70. For example, the grow light bar may be mounted along pole 22 parallel to first plant growing direction of plant container 10. In another embodiment, the grow light bar may be integral with the trellis itself, wherein a plurality of light sources are installed onto trellis 20 along its length. The grow lights may be powered through an electrical outlet, or may be powered using other sources such as batteries.

Figure 9:
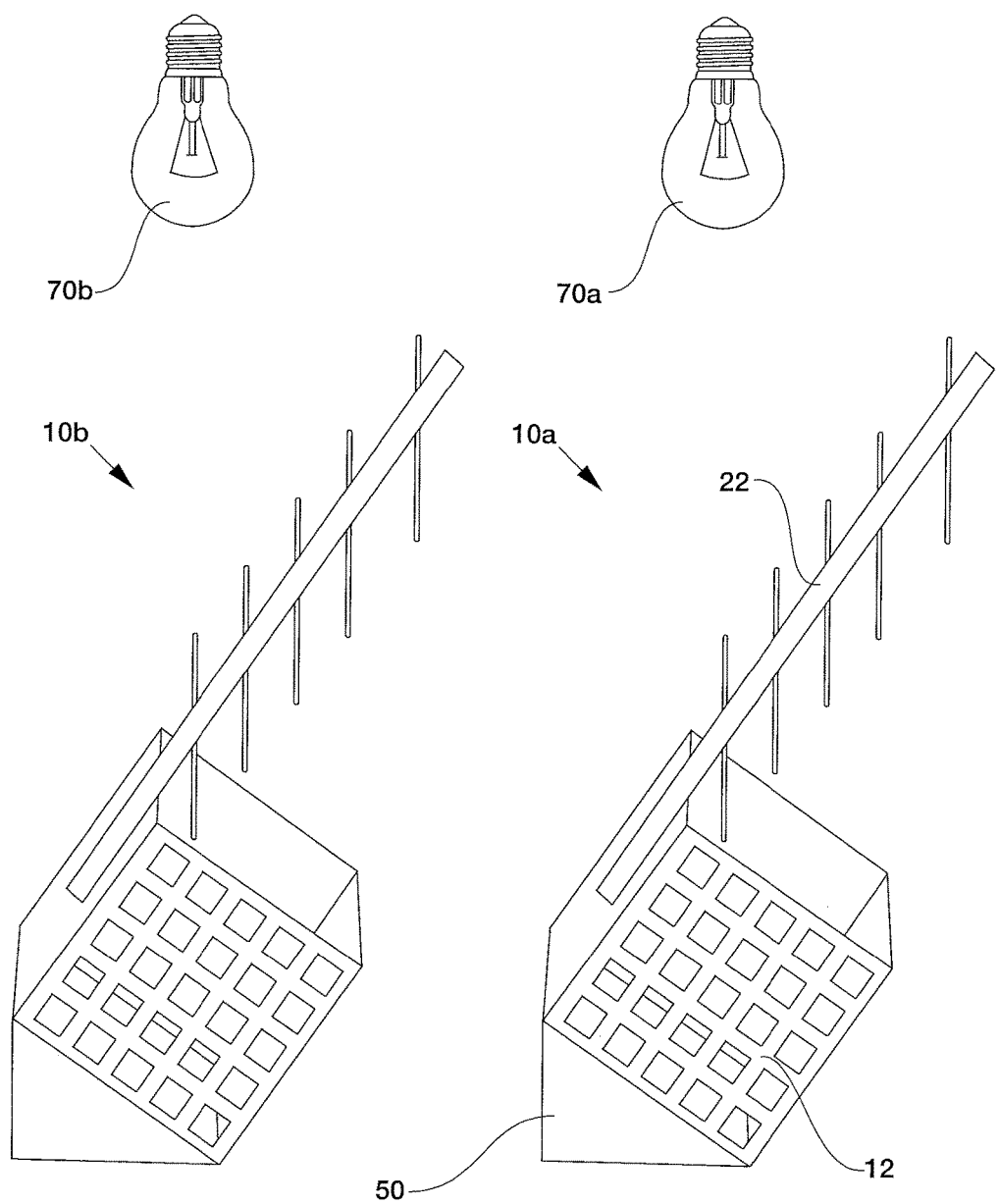
FIG. 9 is an illustration depicting a first plant container positioned at a 45° degree angle adjacent to a second plant container positioned at a 45° degree angle.
Figure 10:
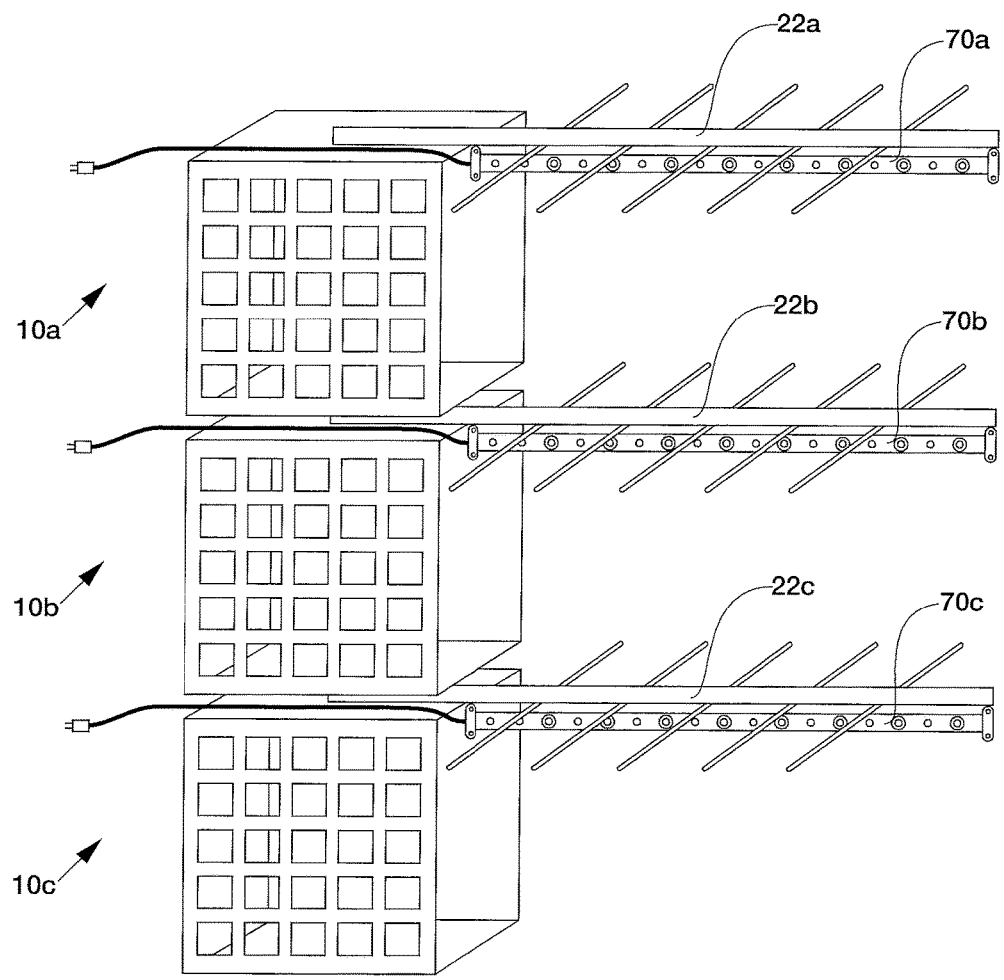
FIG. 10 is an illustration depicting a plurality of plant containers laterally stacked in a second plant growing direction.
Figure 11:
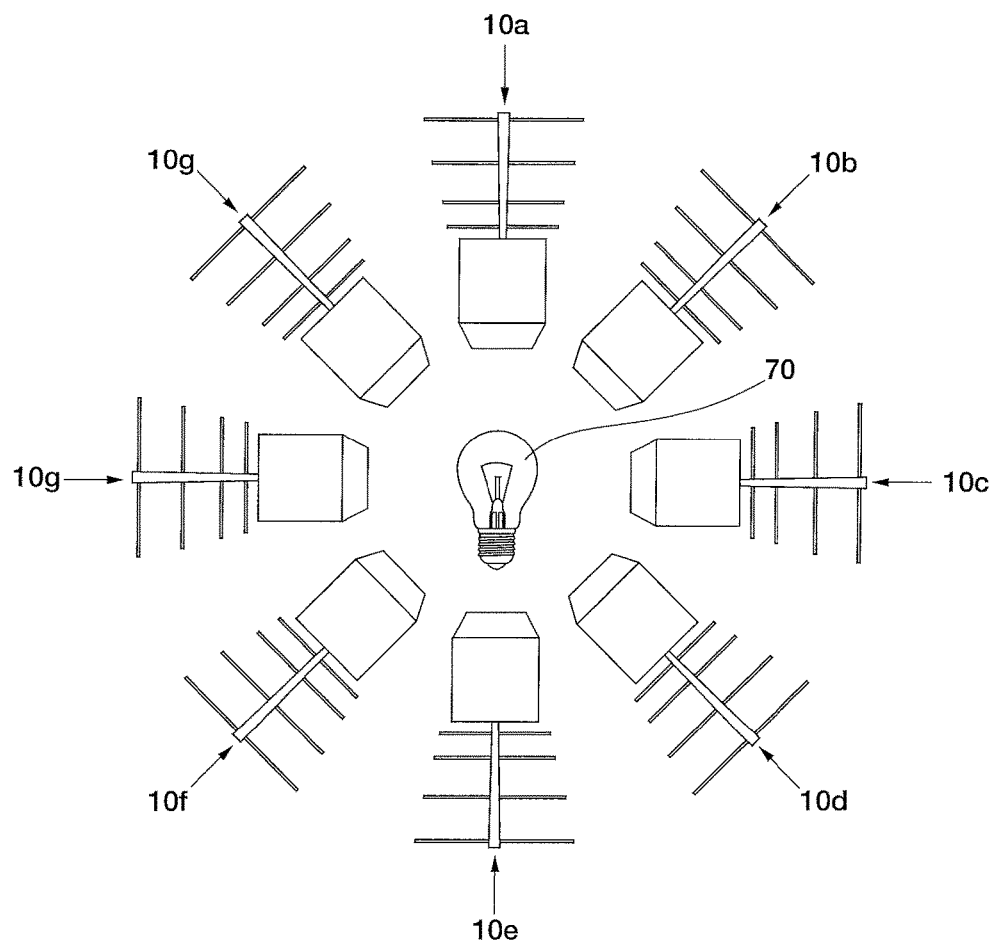
FIG. 11 is an illustration depicting a plurality of plant containers arranged around a single grow light.

In operation, plant container 10 may be individually positioned and arranged with other plant containers in a variety of configurations to increase production and energy efficiency. FIG. 9 shows one example where two plant containers are positioned next to each other, wherein each plant container is under a grow light and oriented at a 45° degree angle. The shape of rigid outer container 12 may also enable a plurality of plant containers to be stacked on top of one another. As best seen in FIG. 10, each plant container is positioned in a second plant growing direction and stacked with another plant container on a sidewall. Each plant container may have access to a grow light stemming from a trellis on an adjacent plant container. FIG. 11 depicts another configuration wherein a single grow light may be shared by a plurality of plant containers. The plant containers are each positioned at a 45° degree angle toward the grow light.

Figure 12:
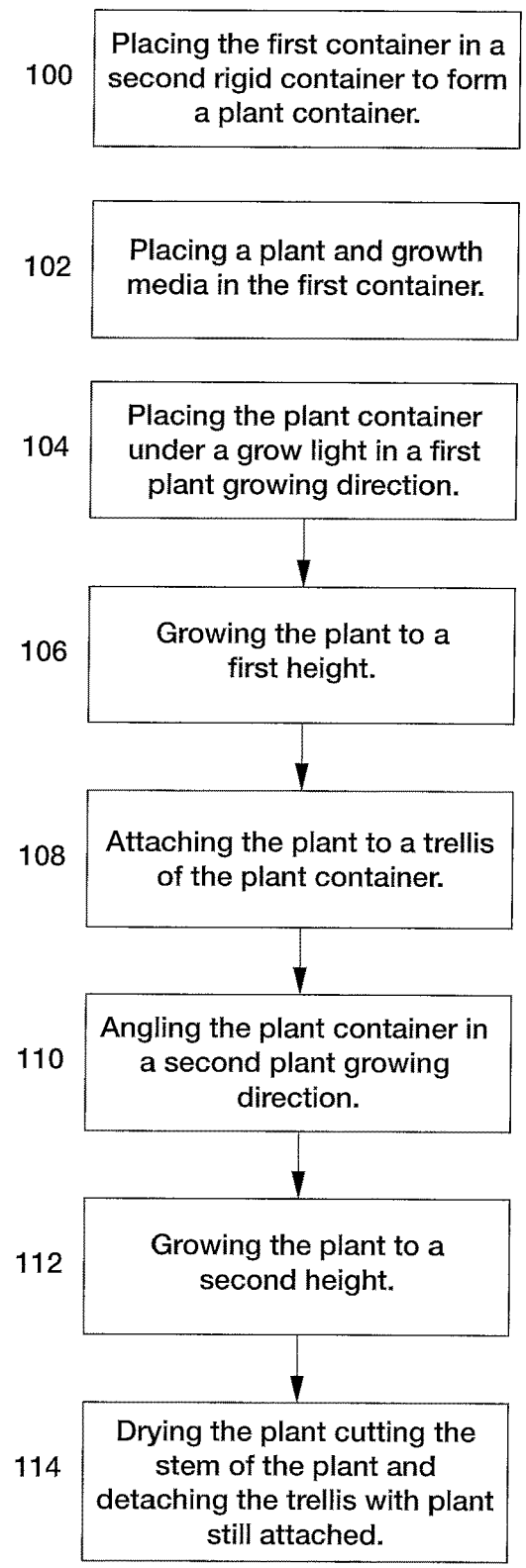
FIG. 12 is a flow chart illustrating one example of increasing the production of a plant using a plant container constructed according to the present inventions.

The present inventions also include a method for improving the growth efficiency and yields of a plant. As seen in FIG. 12, the method may comprise the steps of placing a flexible container into a second rigid container to form a plant container 100. One or more plants may be placed in the flexible container having growth media 102. The plant container is then placed under a grow light until the one or more plants reaches a first growth height. Once the one or more plants reaches a first growth height, the plant may be attached to a trellis installed on the plant container 108. The one or more plants may be attached by spacing out the branches and bending the wires of the trellis to accommodate the desired branch spacing. The angle of the plant container is then adjusted to a second position, and the one or more plants are allowed to continue growing to a second height. Once the one or more plants reach the second growth height, the trellis may be used as a drying rack. For example, the main plant stem may be removed from the plant container by cutting it and detaching the trellis 114. The one or more plants may then be hung to dry while it is still on the trellis.

Certain modifications and improvements will occur to those skilled in the art upon a reading of the foregoing description. By way of example, the desired ranges of porosity and pore size for the inner container are not limited to knitted fabrics but also includes woven and non-woven fabric. In addition, the desired ranges may be accomplished using conventional techniques known within the textile field, such as needle punching a fabric to provide the desired ranges of porosity and pore size for the inner container. Also, one or more plants may be grown in the same container depending on the type of plants being grown and its tolerance for proximity with other plants of similar or dis-similar type. It should be understood that all such modifications and improvements have been deleted herein for the sake of conciseness and readability but are properly within the scope of the following claims.

What is claimed:

1. An apparatus for improving plant yield, said apparatus comprising:
    (a) a plant container adapted to be movable between a first plant growing direction and a second plant growing direction; and
    (b) a rigid trellis attached to said plant container, wherein said trellis includes at least one pole and a plurality of support wires attached to said pole and wherein said support wires are spring loaded for providing positioning along the length of said pole.

2. The apparatus according to claim 1, wherein the ends of said support wires are blunted.

3. The apparatus according to claim 1, wherein said support wires are bendable to be positionable along a plant's branches.

4. The apparatus according to claim 1, wherein said trellis is removably attached to said plant container.

5. The apparatus according to claim 1 further including a grow light bar.

6. The apparatus according to claim 5, wherein said grow light bar is attached along the length of said trellis parallel to said plant first growing direction.

7. A plant container for improving plant yield adapted to be movable between a first plant growing direction and a second plant growing direction, said plant container comprising:
(a) a first rigid outer container; and
(b) a second flexible inner container adapted to be received by said outer container and for containing growing media for one or more plants, wherein at least a portion of said flexible inner container is a knitted fabric.

8. The apparatus according to claim 7, wherein said first rigid outer container includes a top, a bottom and sidewalls, wherein at least said top and a portion of said side walls are an open lattice network.

9. The apparatus according to claim 8, wherein said open lattice network is about 50% open to provide structural support of said flexible inner container while, at the same time, permitting access to said flexible inner container.

10. The apparatus according to claim 7, wherein said rigid outer container is generally rectangular.

11. The apparatus according to claim 10, wherein said rigid outer container is generally cubic to provide stackability and high density population with respect to adjacent containers.

12. The apparatus according to claim 7, wherein said rigid outer container further includes an angled support base.

13. The apparatus according to claim 12, wherein said angled support base is at about 45° degrees.

14. The apparatus according to claim 7, wherein said flexible inner container is formed of a single knit jersey polypropylene fabric.

15. The apparatus according to claim 7, wherein the porosity of said flexible inner container is greater than about 40% porosity and less than about 85% porosity to allow water and water with nutrients to be added to the plant growing media through the porous wall of said flexible inner container.

16. The apparatus according to claim 15, wherein the porosity of said flexible inner container is about 60% porosity.

17. The apparatus according to claim 7, wherein the pore size of said flexible inner container is less than about 0.2 millimeters and greater than about 0.05 millimeters.

18. The apparatus according to claim 17, wherein the pore size of said flexible inner container is about 0.15 millimeters.

19. An apparatus for improving plant yield, said apparatus comprising:
(a) a plant container adapted to be movable between a first plant growing direction and a second plant growing direction, said plant container including (i) a first rigid outer container and (ii) a second flexible inner container adapted to be received by said outer container and for containing growing media for one or more plants, wherein at least a portion of said flexible inner container is a knitted fabric; and
(c) a rigid trellis attached to said plant container.

20. The apparatus according to claim 19, wherein said trellis includes at least one pole and a plurality of support wires attached to said pole.

21. The apparatus according to claim 20, wherein the ends of said support wires are blunted.

22. The apparatus according to claim 20, wherein said support wires are spring loaded for providing positioning along the length of said pole.

23. The apparatus according to claim 20, wherein said support wires are bendable to be positionable along a plant's branches.

24. The apparatus according to claim 19, wherein said trellis is removably attached to said plant container.

25. The apparatus according to claim 19 further including a grow light bar.

26. The apparatus according to claim 25, wherein said grow light bar is attached along the length of said trellis parallel to said plant first growing direction.

27. The apparatus according to claim 19, wherein said first rigid outer container includes a top, a bottom and sidewalls, wherein at least said top and a portion of said side walls are an open lattice network.

28. The apparatus according to claim 27, wherein said open lattice network is about 50% open to provide structural support of said flexible inner container while, at the same time, permitting access to said flexible inner container.

29. The apparatus according to claim 19, wherein said rigid outer container is generally rectangular.

30. The apparatus according to claim 29, wherein said rigid outer container is generally cubic to provide stackability and high density population with respect to adjacent containers.

31. The apparatus according to claim 19, wherein said rigid outer container further includes an angled support base.

32. The apparatus according to claim 31, wherein said angled support base is at about 45° degrees.

33. The apparatus according to claim 19, wherein said flexible inner container is faulted of a single knit jersey polypropylene fabric.

34. The apparatus according to claim 19, wherein the porosity of said flexible inner container is greater than about 40% porosity and less than about 85% porosity to allow water and water with nutrients to be added to the plant growing media through the porous wall of said flexible inner container.

35. The apparatus according to claim 34, wherein the porosity of said flexible inner container is about 60% porosity.

36. The apparatus according to claim 19, wherein the pore size of said flexible inner container is less than about 0.2 millimeters and greater than about 0.05 millimeters.

37. The apparatus according to claim 36, wherein the pore size of said flexible inner container is about 0.15 millimeters.

* * * * *